(12) United States Patent
Cohen

(10) Patent No.: US 8,939,068 B2
(45) Date of Patent: Jan. 27, 2015

(54) MULTIPLE DRAWER SMOKER

(75) Inventor: Jared I. Cohen, Cartersville, GA (US)

(73) Assignee: Landmann USA, Cartersville, GA (US)

( * ) Notice: Subject to any disclaimer, the term of this patent is extended or adjusted under 35 U.S.C. 154(b) by 653 days.

(21) Appl. No.: 13/098,145

(22) Filed: Apr. 29, 2011

(65) Prior Publication Data

US 2011/0268853 A1 Nov. 3, 2011

Related U.S. Application Data

(60) Provisional application No. 61/329,149, filed on Apr. 29, 2010.

(51) Int. Cl.
| | | |
|---|---|---|
| *A23B 4/03* | (2006.01) | |
| *A47J 37/07* | (2006.01) | |
| *A47J 43/28* | (2006.01) | |
| *A47J 43/06* | (2006.01) | |
| *A47J 37/12* | (2006.01) | |
| *A47J 39/00* | (2006.01) | |
| *G08B 17/00* | (2006.01) | |
| *G08B 23/00* | (2006.01) | |
| *G08C 19/16* | (2006.01) | |
| *G08C 19/12* | (2006.01) | |
| *G08C 19/22* | (2006.01) | |
| *G08B 19/00* | (2006.01) | |
| *A23B 4/044* | (2006.01) | |

(52) U.S. Cl.
CPC ..................................... *A23B 4/044* (2013.01)
USPC .................. 99/482; 99/340; 99/342; 99/343; 99/344; 99/410; 99/412; 99/414; 99/415; 99/339; 99/448; 340/870.01; 340/870.17; 340/870.04; 340/870.09; 340/501; 340/588; 340/584; 340/585; 374/155; 374/141; 374/149; 374/150; 374/179

(58) Field of Classification Search
CPC .. A23B 4/044; A47J 37/0611; A47J 37/0704; A47J 37/041; A47J 37/0786; A47J 37/0713
USPC ........... 392/501; 99/482, 340, 342, 343, 344, 99/410, 412, 414, 415, 339, 448, 425; 340/870.01, 870.17, 870.04, 870.09, 340/501, 588, 584, 585; 374/155, 141, 149, 374/150, 179
See application file for complete search history.

(56) References Cited

U.S. PATENT DOCUMENTS

| | | | | | |
|---|---|---|---|---|---|
| 3,316,831 | A | * | 5/1967 | Koland et al. | 99/352 |
| 3,355,573 | A | * | 11/1967 | Wilson | 219/396 |
| 3,477,360 | A | * | 11/1969 | Raney | 99/339 |
| 3,776,127 | A | * | 12/1973 | Muse | 99/482 |
| 3,882,767 | A | * | 5/1975 | Oyler et al. | 99/339 |
| 4,094,295 | A | * | 6/1978 | Boswell et al. | 126/25 R |
| 4,233,890 | A | * | 11/1980 | Jansen | 99/340 |
| 4,455,924 | A | * | 6/1984 | Wenzel | 99/333 |

(Continued)

*Primary Examiner* — Dana Ross
*Assistant Examiner* — Gyounghyun Bae
(74) *Attorney, Agent, or Firm* — McClure, Qualey & Rodack, LLP

(57) ABSTRACT

Disclosed herein is a smoker with multiple separate drawers for smoking meat, fish, sausage, etc. In an example embodiment, one drawer may contain water and another drawer may contain smoking material such as wood chips. The sliding drawers enable the maintenance of a stable smoking temperature and offer a safer means to replenish water and/or wood during the actual smoking operation. The multiple drawers allow a user to add wood and/or water without opening the smoking chamber.

16 Claims, 6 Drawing Sheets

(56) References Cited

U.S. PATENT DOCUMENTS

| | | | |
|---|---|---|---|
| 4,471,748 A * | 9/1984 | Venable | 126/1 E |
| 4,721,037 A * | 1/1988 | Blosnich | 99/482 |
| 4,757,756 A * | 7/1988 | Van Marr | 99/482 |
| 4,924,071 A * | 5/1990 | Jacobs | 219/400 |
| 5,078,049 A * | 1/1992 | Glanton | 99/482 |
| 5,704,278 A * | 1/1998 | Cross | 99/427 |
| 5,891,498 A * | 4/1999 | Boehler | 426/314 |
| 6,012,382 A | 1/2000 | McLemore | |
| 6,029,566 A | 2/2000 | McLemore | |
| 6,289,795 B1 | 9/2001 | McLemore et al. | |
| 6,626,090 B2 | 9/2003 | McLemore et al. | |
| 6,708,604 B1 * | 3/2004 | Deichler, Jr. | 99/482 |
| 6,711,992 B1 | 3/2004 | McLemore | |
| 6,742,446 B2 | 6/2004 | McLemore et al. | |
| 6,913,011 B1 * | 7/2005 | Snider | 126/9 R |
| 6,941,857 B2 | 9/2005 | McLemore | |
| D516,374 S | 3/2006 | McLemore | |
| D520,802 S | 5/2006 | McLemore et al. | |
| 7,227,107 B2 | 6/2007 | McLemore et al. | |
| D560,424 S | 1/2008 | McLemore | |
| 7,426,885 B2 | 9/2008 | McLemore et al. | |
| 7,451,691 B2 * | 11/2008 | Robertson | 99/330 |
| 7,665,663 B2 | 2/2010 | Hoffer et al. | |
| 7,703,386 B1 * | 4/2010 | Bourgeois et al. | 99/340 |
| 7,703,389 B2 | 4/2010 | McLemore et al. | |
| D615,798 S | 5/2010 | McLemore et al. | |
| D616,243 S | 5/2010 | McLemore et al. | |
| D625,545 S | 10/2010 | McLemore et al. | |
| D629,244 S | 12/2010 | McLemore et al. | |
| 7,861,705 B2 * | 1/2011 | Hulsey | 126/25 A |
| 2002/0040644 A1 | 4/2002 | McLemore et al. | |
| 2003/0005828 A1 | 1/2003 | McLemore et al. | |
| 2004/0103795 A1 | 6/2004 | McLemore | |
| 2005/0121020 A1 | 6/2005 | McLemore et al. | |
| 2005/0276892 A1 | 12/2005 | McLemore | |
| 2006/0091137 A1 | 5/2006 | McLemore et al. | |
| 2006/0137543 A1 | 6/2006 | McLemore et al. | |
| 2006/0254432 A1 | 11/2006 | McLemore | |
| 2008/0233257 A1 | 9/2008 | McLemore et al. | |
| 2009/0078127 A1 | 3/2009 | McLemore et al. | |
| 2009/0087534 A1 | 4/2009 | McLemore | |
| 2009/0199839 A1 * | 8/2009 | Hulsey | 126/25 A |
| 2009/0320882 A1 * | 12/2009 | Averwater | 134/22.1 |
| 2010/0206287 A1 | 8/2010 | McLemore et al. | |
| 2011/0081471 A1 | 4/2011 | McLemore et al. | |
| 2011/0268853 A1 * | 11/2011 | Cohen | 426/315 |

* cited by examiner

FIG. 6 600

610 — PROVIDING A SMOKING CABINET FOR SMOKING ARTICLES, THE CABINET COMPRISING A SMOKING CHAMBER; AT LEAST A FIRST DRAWER LOCATED PROXIMATELY BENEATH THE SMOKING CABINET, THE FIRST DRAWER CONFIGURED TO HOLD A LIQUID; AND AT LEAST A SECOND DRAWER LOCATED PROXIMATELY BENEATH THE FIRST DRAWER, THE SECOND DRAWER CONFIGURED TO HOLD A SMOKING MATERIAL

620 — HEATING THE SMOKING CABINET WITH A HEATING SOURCE LOCATED PROXIMATELY BENEATH THE SECOND DRAWER

MULTIPLE DRAWER SMOKER

CROSS-REFERENCE TO RELATED APPLICATION

This application claims benefit to U.S. provisional patent application Ser. No. 61/329,149, filed on Apr. 29, 2010, which is incorporated by reference herein.

TECHNICAL FIELD

The present disclosure is generally related to cooking and, more particularly, is related to outdoor smokers.

BACKGROUND

To smoke, a user needs a container to hold in the smoke, a source of heat, a source of the smoke, and some food to smoke. The source of the smoke may be hardwood. The process of smoking has grown around cuts of meat that traditionally don't come out well with any other cooking method. A good example of this is brisket, which is very tough and not very easy to eat unless it is cooked very slowly at a low temperature. Proper temperature control is important. Meat smoking is best done in the range of 225-250 degrees F. To be safe most meats need to be cooked to an internal temperature of 145 degrees F. and poultry to 165 degrees F. In most smokers, a heat source is required to produce moist heat and to produce the smoke. There are heretofore unaddressed needs with outdoor smoker systems and methods.

SUMMARY

Example embodiments of the present disclosure provide a multiple drawer smoker. Briefly described, in architecture, one example embodiment of the smoker, among others, can be implemented as follows: a smoking cabinet comprising: a smoking chamber; and multiple drawers located proximately beneath the smoking chamber, each drawer configured to provide access to an item used to produce smoke for the smoking chamber; and a heating element located proximately beneath the multiple drawers.

Embodiments of the present disclosure can also be viewed as providing methods of smoking. In this regard, one embodiment of such a device, among others, can be broadly summarized by the following: providing a smoking cabinet for smoking articles, the cabinet comprising: a smoking chamber; at least a first drawer located proximately beneath the smoking cabinet, the first drawer configured to hold a liquid; at least a second drawer located proximately beneath the first drawer, the second drawer configured to hold a smoking material; and heating the smoking cabinet with a heating source located proximately beneath the second drawer.

BRIEF DESCRIPTION OF THE DRAWINGS

FIG. 6 is a flow diagram of a method of multiple drawer smoking.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Disclosed herein is a multiple drawer smoker. More specifically, this disclosure provides a smoker with multiple separate drawers for smoking meat, fish, sausage, etc. In an example embodiment, one drawer may contain water and another drawer may contain smoking material such as wood chips. Embodiments of this disclosure may be embodied in many different forms and should not be construed as limited to the embodiments set forth herein. The examples set forth herein are non-limiting examples and are merely examples among other possible examples.

To smoke, a user needs a container to hold in the smoke, a source of heat, a source of the smoke, and some food to smoke. The source of the smoke may be hardwood as a non-limiting example. The process of smoking has grown around cuts of meat that traditionally don't come out well with any other cooking method. A good example of this is brisket, which is very tough and not very easy to eat unless it is cooked very slowly at a low temperature. Proper temperature control is important. Meat smoking is best done in the range of 225-250 degrees F. To be safe most meats need to be cooked to an internal temperature of 145 degrees F. and poultry to 165 degrees F. Example embodiments of the multiple drawer smoker disclosed herein provide sliding drawers for at least water and a smoking material, for example, wood chips. The sliding drawers may enable the maintenance of a stable smoking temperature and offer a safer means to replenish water and/or wood during the actual smoking operation. The multiple drawer embodiment allows a user to add wood and/or water without opening the smoking chamber.

Figure 1:
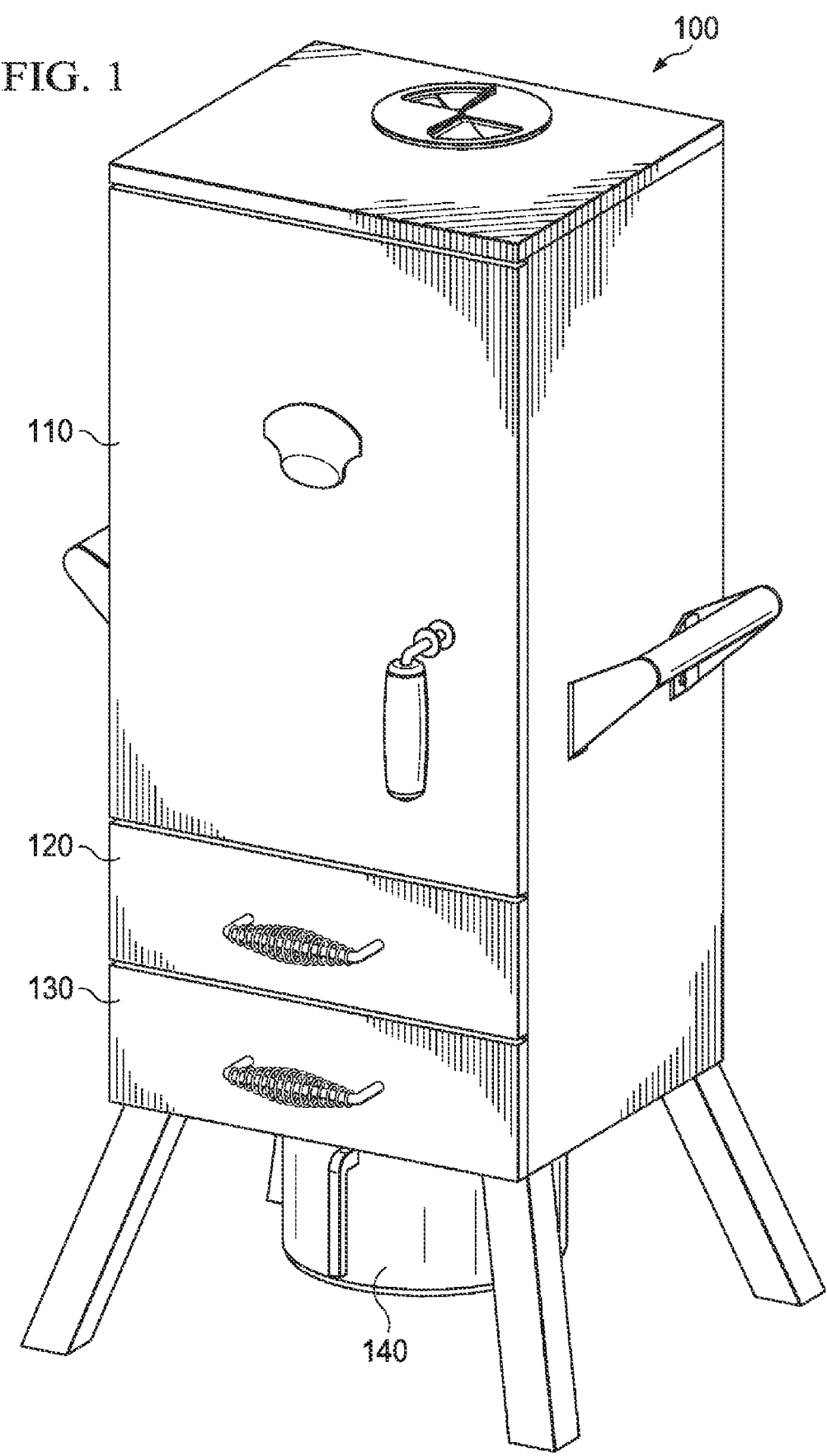
FIG. 1 is a system diagram of an example embodiment of a multiple drawer smoker.

An example embodiment of a multiple drawer smoker is provided in FIG. 1. Multiple drawer smoker 100 includes smoking chamber 110, first drawer 130, second drawer 120 and ash holder 140. Sliding drawers 120, 130 are located at the bottom of smoking chamber 110. First drawer 130 is located proximately below second drawer 120. Ash holder 140 may be located proximately below first drawer 130. First drawer 130 may include a heating means. Example embodiments of the heating means in first drawer 130 may include charcoal and/or wood as non-limiting examples. In operation, the heating means in drawer 130 in addition to charcoal, may contain smoking material, for example, but not limited to, wood chips. Example woods include mesquite, oak, beech, cherry, alder, walnut, chestnut, birch, hickory, and poplar, among others. Second drawer 120 may contain a water pan for holding water. A two drawer version of multiple drawer smoker 100 is provided in FIG. 1. However, more than two drawers may be implemented to achieve similar results.

In using the multiple drawer smoker 100, items to be smoked, such as meats, fish, nuts, cheese may be placed in smoking chamber 110. First drawer 130, may contain a charcoal pan with grate, which along with the wood will create the heat for the smoking function. Second drawer 120, located proximately above first drawer 130, holds water in a water pan to create the steam heat that mixes with the smoke. It is useful to maintain a consistent temperature in smoking chamber 110. The water in the water pan will eventually evaporate and the wood chips will burn. During normal, long-smoking operations, the water and wood in both drawers 120, 130 may be checked periodically to add more water to the water pan and/or more charcoal and wood chips. Multiple drawer system 100 provides a means to easily and safely change or add new materials to the contents of drawers 120 and 130. This allows the smoking materials to be changed without disturbing the smoke content or the temperature of smoking chamber 110. Having multiple drawers 120, 130 allows for the changing of one item without removing another from smoker 100. It also allows a quicker change or addition of the smoking materials.

In multiple drawer smoker 100, drawers 120, 130 allow immediate access to either the wood chip box or the water pan without opening the complete front door. Opening the door may result in temporary loss of heat and smoke from smoking chamber 110. Opening either drawer 120 or 130, instead, may reduce the heat and smoke recovery time by allowing less heat and smoke to escape during wood chip box or water pan review.

Figure 2:
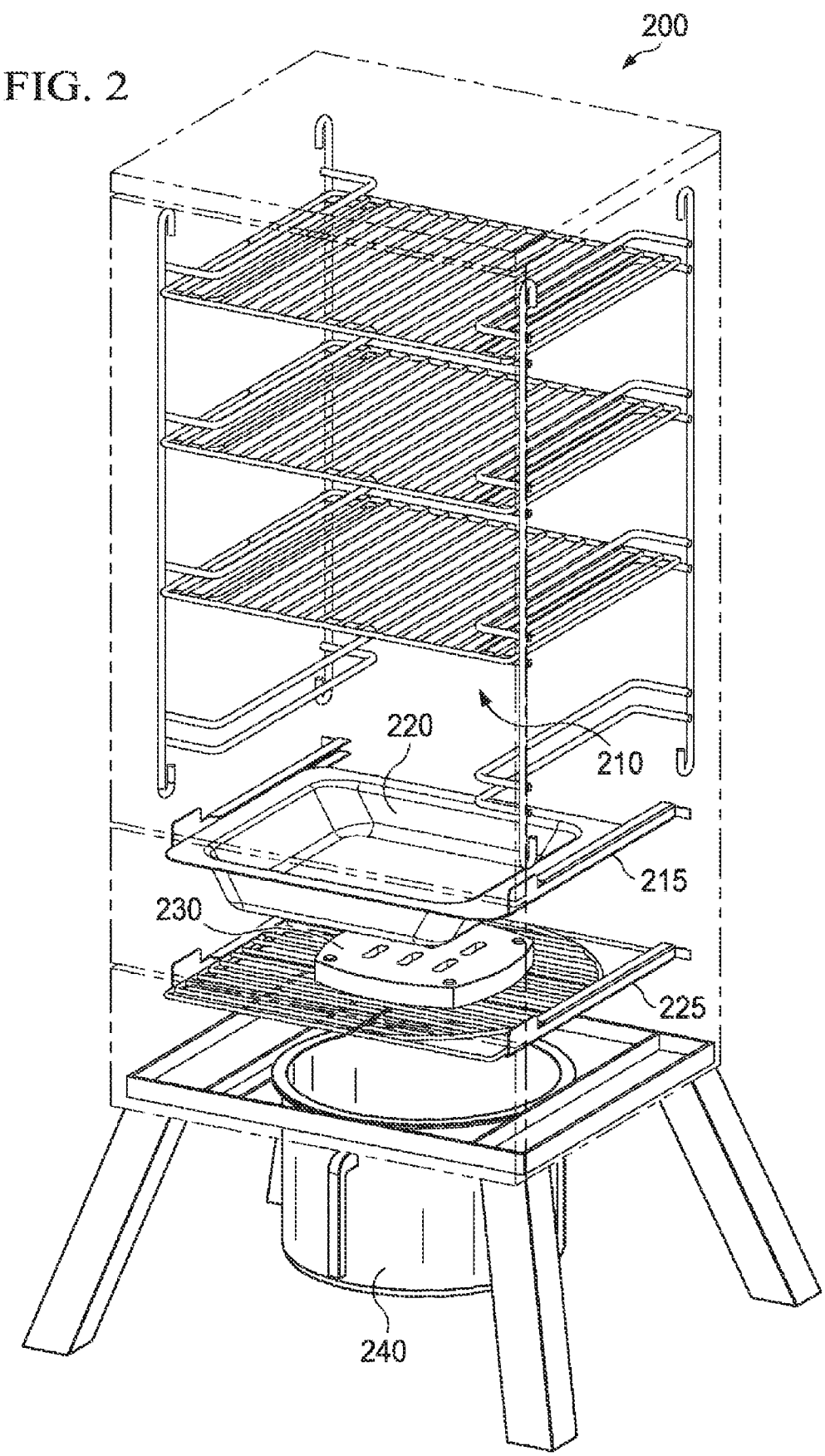
FIG. 2 is an exploded system diagram of an example embodiment of the multiple drawer smoker of FIG. 1.

In an example embodiment provided in FIG. 2, multiple drawer smoker 200 comprises smoking chamber 210 with water pan 220, wood chip box 230, and ash holder 240. The drawers holding water pan 220 and wood chip box 230 may be positioned on tracks 215 and 225 respectively that allow the drawers to extend out to the correct position, to stop, and/or to remain level. The drawer holding water pan 220 may remain level when opened so that no hot water splashes when the drawer is opened. Each drawer may have a built-in stop to prevent the drawer from prematurely detaching from tracks 215, 225 and the cooking chamber. There is no need for the user to touch the contents of either drawer during review, because the drawers safely hold chip box 230 and water pan 220 in place. If either chip box 230 or water pan 220 needs to be replenished, the replenishing may be performed without physically touching the hot box 230 or hot pan 220. In an example embodiment, multiple drawer smoker 200 allows either or both drawers to be extended out simultaneously without either interfering with the other.

Figure 3:
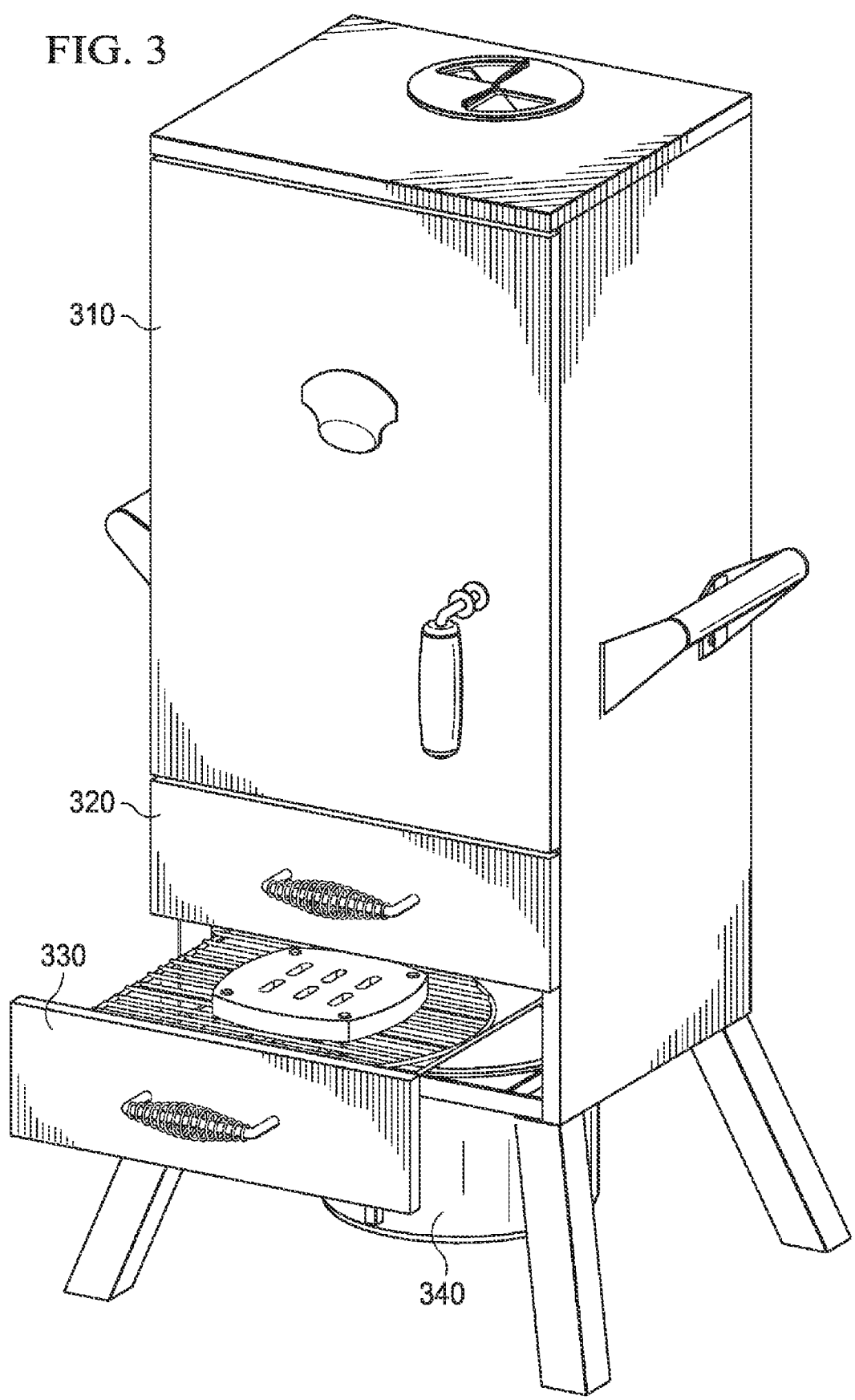
FIG. 3 is a system diagram of an example embodiment of the multiple drawer smoker of FIG. 1.

During smoking operation, as shown in FIG. 1, the doors and drawers of disclosed smoker 100 are normally in the closed position. As provided in FIG. 3, to check the wood chip status, wood chip drawer 330 may be opened for wood chip inspection. Wood may be added as desired. After the inspection and/or addition of wood, drawer 330 may be safely moved to the closed position. Water pan drawer 320 may remain closed while wood chip drawer 330 is opened. This two drawer system allows smoking chamber 310 to retain its heat and smoke. Similarly, to check the water pan, water pan drawer 320 may be opened and the water level may be inspected. Water may be added as desired and water pan drawer 320 may be safely returned to the closed position. A heating means in drawer 330 supplies the heat to produce the smoke. The heating means may comprise, as non-limiting examples, charcoal and/or wood, among others.

Figure 4:
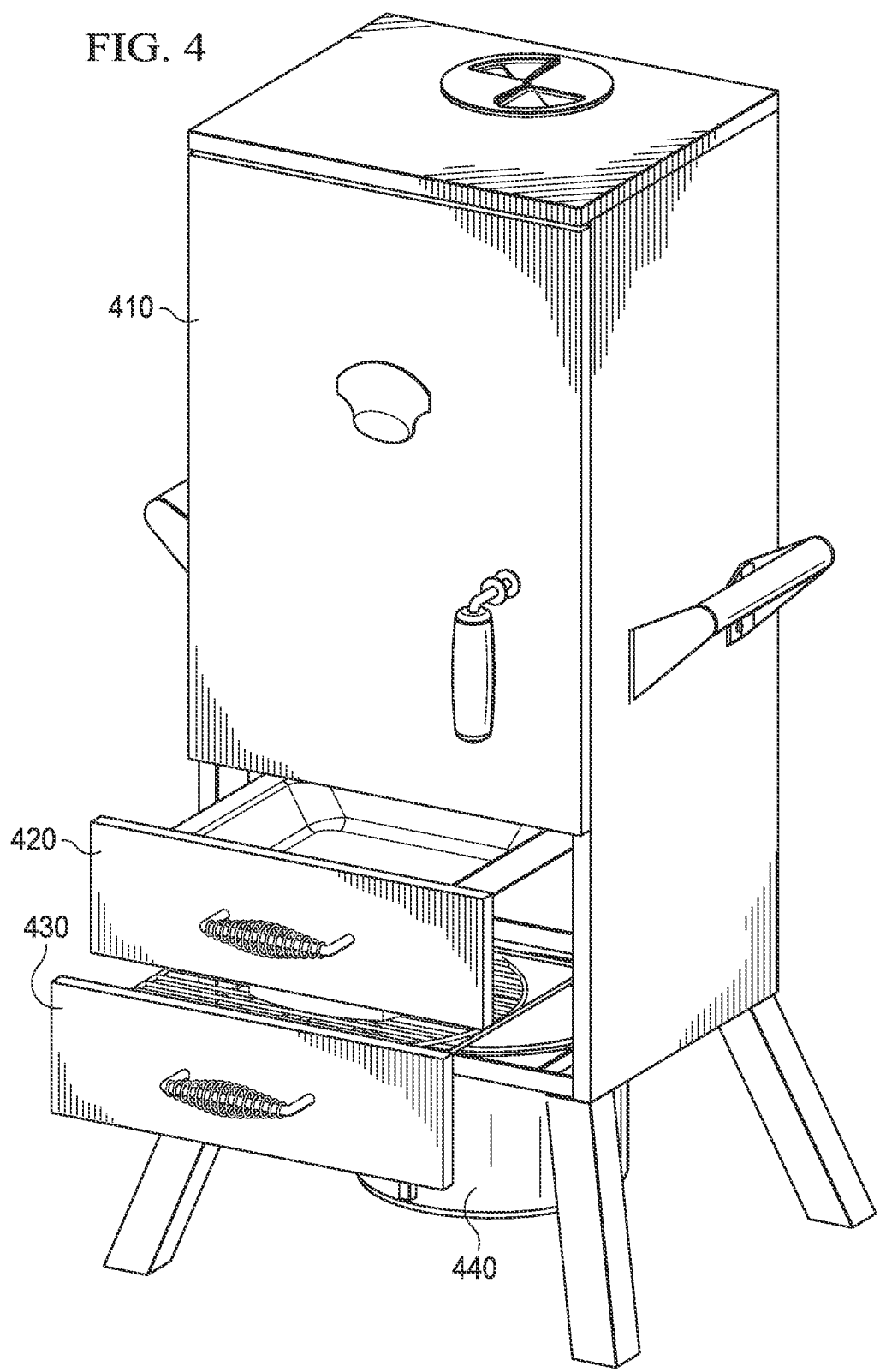
FIG. 4 is a system diagram of an example embodiment of the multiple drawer smoker of FIG. 1.

An alternative example embodiment of a multiple drawer smoker is provided in FIG. 4. The multiple drawer smoker includes smoking chamber 410, first drawer 430, second drawer 420 and ash holder 440. Sliding drawers 420 and 430 are located at the bottom of smoking chamber 410. First drawer 430 is located proximately below second drawer 420. Ash holder 440 may be located proximately below first drawer 430. Example embodiments of heating a means in drawer 430 may include charcoal and/or wood burning materials as non-limiting examples. In operation, the heating means in drawer 430 applies heat to the contents of second drawer 420. In an example embodiment, first drawer 430, in addition to charcoal may contain a water pan for holding water. First drawer 430 may contain smoking material, for example, but not limited to, wood chips. Example woods include mesquite, oak, beech, cherry, alder, walnut, chestnut, birch, hickory, and poplar, among others. A two drawer version of multiple drawer smoker 400 is provided in FIG. 4. However, more than two drawers may be implemented to achieve similar results.

In using the multiple drawer smoker 400, items to be smoked, such as meats, fish, nuts, cheese may be placed in smoking chamber 410. First drawer 430, proximately located above ash holder 440, may contain a wood chip box, which may hold the wood above the water for the smoking function. Second drawer 420, located proximately above first drawer 430, holds water in a water pan to create the steam heat that mixes with the smoke. It is useful to maintain a consistent temperature in smoking chamber 410. The water in the water pan will eventually evaporate and the wood chips will burn. During normal, long-smoking operations, the water and wood in both drawers 420, 430 may be checked periodically to add more water to the water pan and/or more wood chips. The multiple drawer system provides a means to easily and safely change or add new materials to the contents of drawers 420, 430. This allows the smoking materials to be changed without disturbing the smoke content or the temperature of smoking chamber 410. Having multiple drawers 420, 430 allows for the changing of one item without removing another. It also allows a quicker change or addition of the smoking materials.

In the multiple drawer smoker of FIG. 4, drawers 420, 430 allow immediate access to either the wood chip box or the water pan without opening the complete front door. Opening the door may result in temporary loss of heat and smoke from smoking chamber 410. Opening either drawer 420 or 430, instead, may reduce the heat and smoke recovery time by allowing less heat and smoke to escape during wood chip box or water pan review. In the multiple drawer smoker of FIG. 4, both drawers 420 and 430 of the multiple drawer smoker may be in an open position at the same time. This will still allow chamber 410 to retain the heat level provided by heating means 440.

Figure 5:
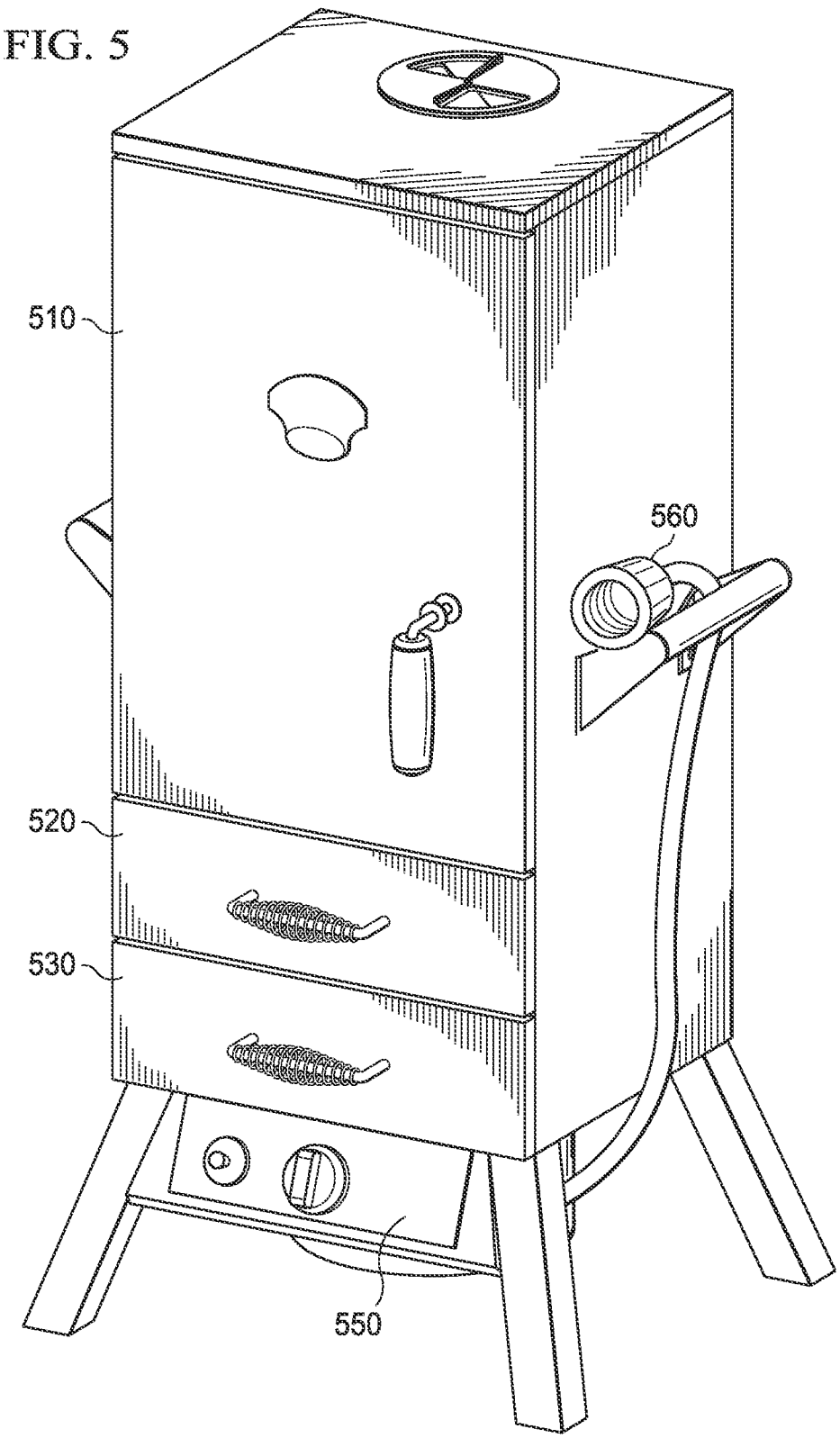
FIG. 5 is a system diagram of an example embodiment of the multiple drawer smoker of FIG. 1.

FIG. 5 provides an example embodiment of a multiple drawer smoker with smoking chamber 510, first drawer 530, second drawer 520, and heating means 550. Heating means 550 may be natural gas or liquid propane as non-limiting examples. Connector 560 may be used to connect to the source of the gas for heating means 550.

FIG. 6 provides flow diagram 600 of a method of smoking. In block 610, a smoking cabinet for smoking articles is provided. The cabinet comprises a smoking chamber; at least a first drawer located proximately beneath the smoking chamber, the first drawer configured to hold a liquid; and at least a second drawer located proximately beneath the first drawer, the second drawer configured to hold a smoking material. In block 620 the smoking cabinet is heated with a heating source located proximately beneath the second drawer.

Two door units, such as Brinkman Model number 810-5502-W, offer access to the cooking chamber, in which the bottom door provides access to the water pan and wood chip box without opening the top door. At least one distinction between this two door system and the disclosed multiple drawer system is that the user of the two door system physically pulls the hot water pan or hot wood chip box out of the smoker in order to inspect and replenish the contents of the pan. The multiple drawer system allows the user to inspect and replenish either the water pan or the wood chip box, or both, without the user having to handle the hot water pan or hot chip box.

A single drawer unit, such as Charbroil Model number CB600X, offers access to the cooking chamber, in which the drawer provides access to the water pan and wood chip box without having to open the top door. At least one distinction between the single drawer and multiple drawer units is that with the single bottom drawer, both the water pan and wood chip box are removed when the single drawer is opened. To inspect and/or add water or wood chips, the hot water pan and/or wood chip box must be moved, causing a safety issue for the user. With the multiple drawer smoker, each drawer can be opened individually and does not require removal.

Although the smoker disclosed herein is described in a vertical smoker implementation, the disclosed system is also applicable to other smoker implementations, including but not limited to horizontal smokers (for example, barrel and square designs). The present invention has been described in detail; however, it should be understood that various changes, substitutions and alterations can be made thereto without departing from the spirit and scope of the invention as defined by the appended claims.

Therefore, at least the following is claimed:

1. A smoking apparatus comprising:
   a smoking cabinet comprising:
   a smoking chamber having an access door; and
   multiple drawers located proximately beneath the smoking chamber, each drawer having at least a supporting track and being configured to provide access to an item used to produce smoke or steam for the smoking chamber and wherein a first drawer and second drawer of the multiple drawers are configured to be independently operable by moving the drawers laterally along the latitudinal axis of said track; and
   a heating element located proximately beneath the multiple drawers.

2. The smoking apparatus of claim 1, wherein the smoker is a vertical smoker in which the magnitude of the height of the smoking chamber is larger than the magnitude of the width of the smoking chamber.

3. The smoking apparatus of claim 1, wherein at least one of the multiple drawers is configured to hold a liquid.

4. The smoking apparatus of claim 1, wherein at least one of the multiple drawers is configured to hold wood chips.

5. The smoking apparatus of claim 1, wherein:
   at least one drawer of the multiple drawers is configured to hold charcoal and/or wood chips;
   at least one drawer of the multiple drawers is configured to hold water; and
   the at least one drawer holding wood chips is configured to be positioned proximately beneath the at least one drawer holding water.

6. The smoking apparatus of claim 1, wherein the heating element is located external to the smoking cabinet.

7. The smoking apparatus of claim 1, wherein the heating element comprises a charcoal source.

8. The smoking apparatus of claim 1, wherein the heating element comprises a gas based source.

9. A method of smoking comprising:
   providing a smoking cabinet for smoking articles, the cabinet comprising:
   a smoking chamber having a door;
   multiple drawers located proximately beneath the smoking chamber, each drawer having at least a horizontal supporting track configured to allow the drawers to open and close linearly along said supporting track to provide access to an item used to produce smoke and/or steam for the smoking chamber, wherein each drawer is configured to be independently operable; and
   heating the smoking cabinet with a heating source located proximately to the items used to produce smoke and/or steam.

10. The method of claim 9, wherein heating the smoking cabinet with a heating source comprises heating the smoking cabinet with a charcoal heating source.

11. The method of claim 9, wherein heating the smoking cabinet with a heating source comprises heating the smoking cabinet with a natural gas heating source.

12. The method of claim 9, wherein heating the smoking cabinet with a heating source comprises heating the smoking cabinet with a liquid propane heating source.

13. A system comprising:
   a smoking chamber having a door;
   multiple drawers located proximately beneath the smoking chamber, each drawer having at least a horizontal supporting track configured to allow the drawers to open linearly along said supporting track to provide access to an item used to produce smoke and/or steam for the smoking chamber wherein each drawer is configured to be independently operable; and
   a heating element located proximately to the items used to produce smoke and/or steam.

14. The system of claim 13, wherein
   at least one drawer of the multiple drawers is configured to hold charcoal and/or wood chips;
   at least one drawer of the multiple drawers is configured to hold water; and
   the at least one drawer holding charcoal and/or wood chips is configured to be positioned proximately beneath the at least one drawer holding water.

15. The system of claim 13, wherein the heating element is located external to the smoking cabinet.

16. The system of claim 13, wherein a first drawer and a second drawer of the multiple drawers are configured to be independently operable.

* * * * *